United States Patent
Bartley et al.

(10) Patent No.: US 9,703,770 B2
(45) Date of Patent: *Jul. 11, 2017

(54) AUTOMATED VALIDATION OF THE APPEARANCE OF GRAPHICAL USER INTERFACES

(71) Applicant: International Business Machines Corporation, Armonk, NY (US)

(72) Inventors: Timothy S. Bartley, Worongary (AU); Gavin G. Bray, Robina (AU); Elizabeth M. Hughes, Currumbin Valley (AU); Kalvinder P. Singh, Miami (AU)

(73) Assignee: International Business Machines Corporation, Armonk, NY (US)

(*) Notice: Subject to any disclaimer, the term of this patent is extended or adjusted under 35 U.S.C. 154(b) by 267 days.

This patent is subject to a terminal disclaimer.

(21) Appl. No.: 14/219,197

(22) Filed: Mar. 19, 2014

(65) Prior Publication Data

US 2015/0269721 A1    Sep. 24, 2015

(51) Int. Cl.
*G06F 9/44*    (2006.01)
*G06F 17/27*    (2006.01)
(Continued)

(52) U.S. Cl.
CPC ........ *G06F 17/2725* (2013.01); *G06F 3/0484* (2013.01); *G06F 17/212* (2013.01);
(Continued)

(58) Field of Classification Search
CPC .......................... G06F 3/0484; G06F 3/04845
See application file for complete search history.

(56) References Cited

U.S. PATENT DOCUMENTS 6,161,107 A * 12/2000 Stern ................. G06F 17/30017
707/722
2004/0205406 A1* 10/2004 Kaliappan ........... H04L 12/2697
714/31

(Continued)

FOREIGN PATENT DOCUMENTS

KR    1020090065144 A    6/2009
KR    1020130024247 A    3/2013

OTHER PUBLICATIONS

Alegroth, et al., "JAutomate: a Tool for System- and Acceptance-test Automation", 2013 IEEE Sixth International Conference on Software Testing, Verification and Validation, pp. 439-446, <http://ieeexplore.ieee.org/xpl/articleDetails.jsp?tp=&arnumber=6569758&queryText%3DGUI+Test+Automation>.

(Continued)

*Primary Examiner* — Chameli Das
(74) *Attorney, Agent, or Firm* — Trentice V. Bolar; David B. Woycechowsky

(57) ABSTRACT

According to embodiments of the present invention, a first metadata defining how a user interface associated with an application under test should appear is generated using one or more computer processors. An image of the user interface associated with the application under test that is invoked during a test run is captured using one or more one or more computer processors. The captured image is converted, using one or more computer processors, into one or more of a second metadata and text. The first metadata is compared, using one or more computer processors, to the second metadata and the text. In response to the comparison resulting in a difference between the first metadata and the second metadata, the image is stored, using one or more computer processors, and an assessment request is generated using one or more computer processors.

9 Claims, 4 Drawing Sheets

(51) Int. Cl.
  *G06F 3/0484* (2013.01)
  *G06T 7/00* (2017.01)
  *G06F 17/21* (2006.01)
  *G06F 17/22* (2006.01)

(52) U.S. Cl.
  CPC ........ *G06F 17/2247* (2013.01); *G06F 17/272* (2013.01); *G06T 7/0006* (2013.01); *G06T 2200/24* (2013.01); *G06T 2207/30168* (2013.01)

(56) References Cited

U.S. PATENT DOCUMENTS

| | | | |
|---|---|---|---|
| 2005/0154761 A1* | 7/2005 | Lee | G06F 17/30997 |
| 2007/0279701 A1* | 12/2007 | Hsu | G06F 8/30 358/403 |
| 2009/0064029 A1* | 3/2009 | Corkran | G06F 3/0482 715/781 |
| 2009/0182724 A1* | 7/2009 | Day | G06F 17/30442 |
| 2009/0217302 A1* | 8/2009 | Grechanik | G06F 8/70 719/320 |
| 2009/0254572 A1* | 10/2009 | Redlich | G06Q 10/06 |
| 2009/0254883 A1* | 10/2009 | Munson | G06F 11/3624 717/124 |
| 2010/0004975 A1* | 1/2010 | White | G06Q 30/0201 705/7.29 |
| 2010/0037157 A1* | 2/2010 | Chang | G06F 8/36 715/764 |
| 2011/0126158 A1* | 5/2011 | Fogarty | G06F 3/0481 715/835 |
| 2011/0276946 A1 | 11/2011 | Pletter | |
| 2011/0314343 A1 | 12/2011 | Hoke et al. | |
| 2012/0010995 A1* | 1/2012 | Skirpa | G06F 3/0481 705/14.49 |
| 2012/0039536 A1* | 2/2012 | Dejean | G06K 9/03 382/176 |
| 2012/0106852 A1* | 5/2012 | Khawand | H04N 19/619 382/218 |
| 2012/0109882 A1* | 5/2012 | Bouse | H04L 67/306 707/607 |
| 2012/0120317 A1* | 5/2012 | Lee | G06F 17/30817 348/564 |
| 2012/0213043 A1* | 8/2012 | Kawamura | H04N 5/85 369/30.03 |
| 2012/0240236 A1* | 9/2012 | Wyatt | G06F 21/564 726/25 |
| 2012/0243745 A1 | 9/2012 | Amintafreshi | |
| 2012/0271719 A1* | 10/2012 | Straley | G06Q 30/02 705/14.66 |
| 2012/0311541 A1* | 12/2012 | Bullard | G06F 11/368 717/127 |
| 2013/0091416 A1* | 4/2013 | Villoslada De La Torre | G06F 17/2247 715/234 |
| 2013/0232430 A1* | 9/2013 | Reitan | G06F 3/0484 715/765 |
| 2013/0329081 A1* | 12/2013 | Aronsson | H04N 1/32 348/231.2 |
| 2014/0165040 A1 | 6/2014 | Augustin et al. | |
| 2014/0195914 A1* | 7/2014 | Gillard | G06T 7/2033 715/719 |
| 2015/0088875 A1* | 3/2015 | Zhang | G06F 17/30663 707/726 |
| 2015/0095200 A1* | 4/2015 | Watanabe | G06Q 30/0637 705/26.82 |
| 2015/0121193 A1* | 4/2015 | Beveridge | G06F 17/30893 715/234 |
| 2015/0181020 A1* | 6/2015 | Fitzsimmons | H04M 3/42221 379/67.1 |
| 2015/0302182 A1* | 10/2015 | Wyatt | G06F 21/564 726/26 |
| 2016/0004753 A1 | 1/2016 | Schmidt et al. | |
| 2016/0011733 A1* | 1/2016 | Mann | G06F 3/0484 715/709 |
| 2016/0140146 A1* | 5/2016 | Wexler | G06F 17/30253 707/741 |

OTHER PUBLICATIONS

Nagarani, et al., "A Tool Based Approach for Automation of GUI Applications", Raju Institute of Technology, IEEE-20180, Jul. 26-28, 2012, Coimbatore India, <http://ieeexplore.ieee.org/xpl/articleDetails.jsp?tp=arnumber=6396013&sortType%3Ddesc_p_Publication_Year%26queryText%3DGUI+Test+Automation>.

"GUI Automation", © Automation Anywhere, Inc., 2013, <http://www.automationanywhere.com/solutions/gui-automation.htm?r=googledeveloping&w=gui&kw=Gui%20Test%20Automation&match=b&network=g&place=&gclid=CLW1zKaworoCFalV4godOmwARA>.

"Detecting a Cell Using Image Segmentation", provided in Post Disclosure Jul. 28, 2013, <http://www.mathworks.com/help/images/examples/detecting-a-cell-using-image-segmentation.html>.

"Identifying Round Objects", provided in Post Disclosure Jul. 28, 2013, <http://www.mathworks.com/help/images/examples/identifying-round-objects.html>.

"Image Based Testing Basics", T-Plan Robot Enterprise Tutorial, © T-Plan Ltd, Nov. 14, 2013, Version 1.0, <http://www.t-plan.com/robot/docs/tutorials/v2.0/ibt.html>.

"GUI Testing", Testing Anywhere, © Automation Anywhere, Inc., 2013, <http://www.automationanywhere.com/Testing/solutions/automated-gui-testing.htm>.

Bartley et al., "Automated Validation of the Appearance of Graphical User Interfaces" U.S. Appl. No. 15/053,318, filed Feb. 25, 2016.

* cited by examiner

User login

| User Name | walter |
| Password: | ********* |

☑ Remember Login

[Login]

FIG. 2

Benutzeranmeldung

| Benutzerna | walter |
| Passwort: | topsecret |

☑ Anmel dung merken

[~~Anmel den~~]

FIG. 3

AUTOMATED VALIDATION OF THE APPEARANCE OF GRAPHICAL USER INTERFACES

BACKGROUND

The present disclosure relates generally to the field of test automation tools, and more particularly to the automation of graphical user interface validation. A graphical user interface ("GUI") is a type of user interface that allows users to interact with electronic devices through graphical icons and visual indicators, such as secondary notation, as opposed to text-based interfaces, typed command labels, or text navigation. In software development, graphical user interface testing involves testing a product's GUI to ascertain how the application and the user interact and whether the application performs properly. This typically includes how the application handles keyboard and mouse input and how it displays a GUI widget, such as screen text, images, buttons, menus, dialog boxes, icons, and toolbars.

The testing of Web, JAVA® (a commercially available operating system for a virtual machine), Windows®, mobile, and other applications that utilize a graphical user interface (GUI) may be automated (e.g. programmatic and replayed buttons clicks, text input, etc.) using conventional solutions. However, manual testing is typically required to ensure that GUIs are rendered properly as well as are easy to read and manipulate by a user. Potential issues may include a widget that is sized too small for a human to notice and/or click, display of truncated text, and layouts that can lead to a poor user experience. In addition, such issues can become compounded when GUIs are tested across different operating systems, browsers, languages, and/or locales. Current solutions involve both manual and automated testing solutions. For example, manual testing requires a tester to view and compare each aspect of the GUI. Image based automation can involve a comparison of the expected and actual bitmap images.

SUMMARY

According to embodiments of the present invention, a first metadata defining how a user interface associated with an application under test should appear is generated using one or more computer processors. An image of the user interface associated with the application under test that is invoked during a test run is captured using one or more computer processors. The captured image is converted, using one or more computer processors, into one or more of a second metadata and text. The first metadata is compared, using one or more computer processors, to the second metadata and the text. In response to the comparison resulting in a difference between the first metadata and the second metadata, the image is stored, using one or more computer processors, and an assessment request is generated using one or more computer processors.

BRIEF DESCRIPTION OF THE SEVERAL VIEWS OF THE DRAWINGS

FIG. 2 depicts a screenshot of a GUI rendered in English by a Web browser, in accordance with an embodiment of the present invention.

FIG. 3 depicts a screenshot of the GUI rendered in German by the Web browser, in accordance with an embodiment of the present invention.

DETAILED DESCRIPTION

Figure 1:
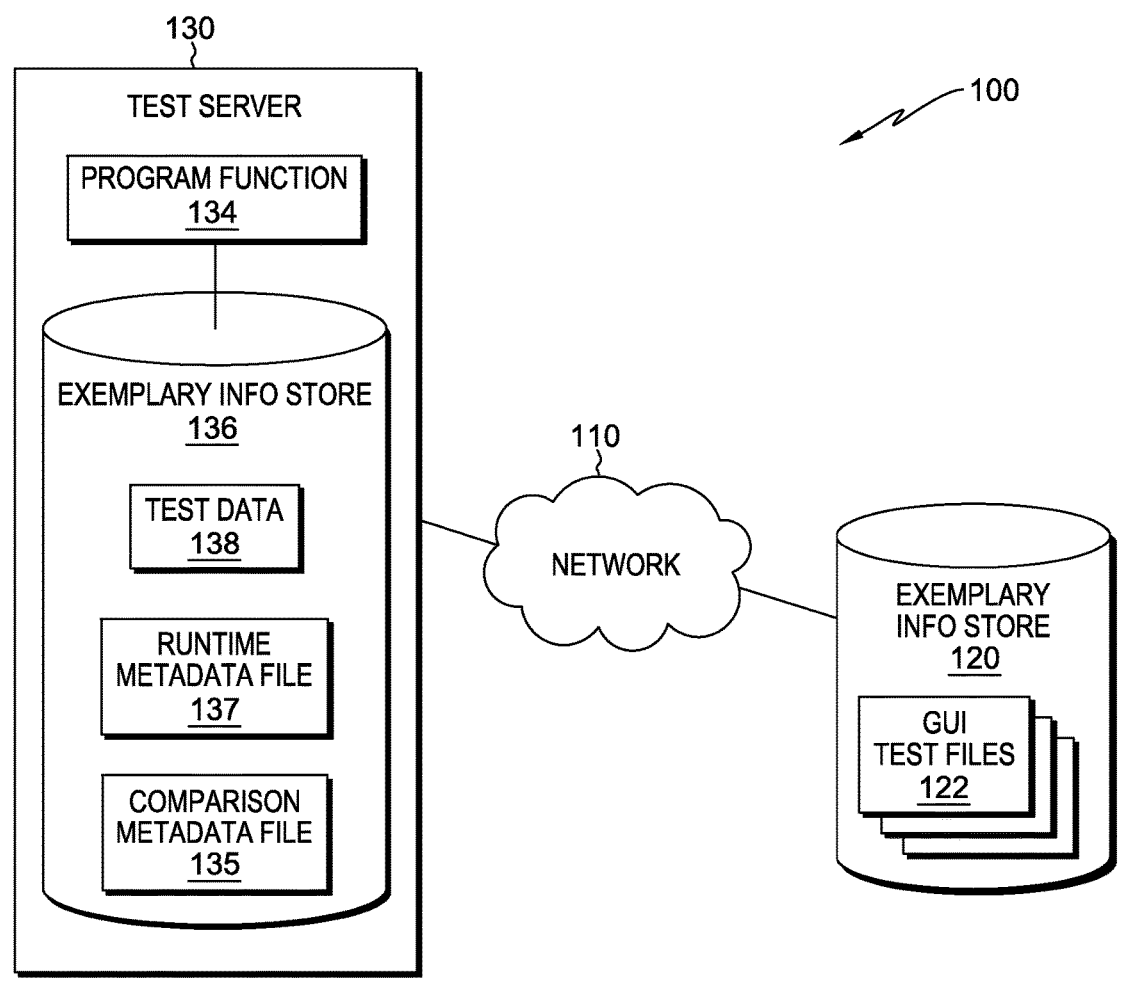
FIG. 1 is a block diagram illustrating an environment, in accordance with an embodiment of the present invention.

With reference now to FIG. 1-5.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The testing of Web, JAVA®, Windows®, mobile, and other applications that utilize a graphical user interface (GUI) may be automated (e.g. programmatic and replayed buttons clicks, text input, etc.) using conventional solutions. Testing typically ensures that GUIs are rendered properly as well as are easy to read and manipulate by a user. Potential issues may include a widget that is sized too small for a human to notice and/or click, truncated text, and layouts that can lead to a poor user experience. In addition, such issues can become compounded when GUIs must be tested across different operating systems, browsers, languages, and/or locales. Embodiments of the present invention seek to provide a method, computer program product, and computer system for automating the validation of the appearance of GUIs.

Briefly, metadata is generated that defines how a particular GUI should appear. This metadata has the structure of a markup language, which includes but is not limited to HyperText Markup Language (HTML), User Interface Language (XUL), and Extensible Application Markup Language (XAML). However, the generated metadata defines what is displayed, such as widgets and layouts, rather than how to display such information. During a GUI testing run images of the application under test are captured as runtime metadata. Image and optical character recognition ("OCR") algorithms can be used to convert the image into metadata and text. The runtime metadata is compared to the comparison metadata. If there is a difference therein, the captured image is saved, and a notification is generated that discloses that the captured image requires further review by a tester/user.

Certain aspects of the present invention seek to identify GUI layouts and other issues when using different operating systems. Globalization issues, such as truncation of long strings, can also be identified. The use of metadata can allow for a higher level representation of an application's GUI compared to the use of bitmap images. Since metadata files are typically smaller than image files, a metadata database can also require less storage space than a corresponding image database.

Embodiments of the present invention will now be described in detail with reference to the Figures. FIG. 1 is a block diagram illustrating an environment, generally designated 100, in accordance with one embodiment of the present invention.

Environment 100 includes test server 130 and exemplary information store 120, all interconnected over network 110. Network 110 can be, for example, a local area network (LAN), a wide area network (WAN), such as the Internet, or a combination of the two, and can include wired, wireless, or fiber optic connections. Network 110 may be a distributed computing environment utilizing clustered computers and components that act as a single pool of seamless resources, as is common in data centers and with cloud computing applications or "clouds". In general, network 110 can be any combination of connections and protocols that will support communications between test server 130 and exemplary information store 120.

In various embodiments of the present invention, test server 130 may be a laptop computer, a tablet computer, a netbook computer, a personal computer (PC), a desktop computer, a server, a personal digital assistant (PDA), a smart phone, or any programmable electronic device capable of communicating with exemplary information store 120 via network 110. Exemplary information store 120 is an information repository that includes GUI test files 122, which are GUI files that require testing. In certain embodiments, exemplary information store 120 is not included in test server 130, but rather communicates with test server 130 via network 110. Test server 130 includes program function 134 and exemplary information store 136.

Exemplary information store 136 is in communication with program function 134, in accordance with an embodiment of the present invention. Exemplary information store 136 includes comparison metadata file 135, runtime metadata file 137, and test data 138. Comparison metadata file 135 can include GUI metadata that is generated manually or automatically, for example, by program function 134. Test data 138 includes test results generated by program function 134. Runtime metadata file 137 includes metadata that is generated by program function 134 of a particular test GUI that is included in GUI test files 122.

Program function 134 is software that tests GUIs using metadata, in accordance with an embodiment of the present invention. Program function 134 can generate metadata that defines how a GUI is associated with an application under test. Metadata generated by program function 134 defines the desired visual layout of GUIs, such as GUIs included in GUI test files 122, scheduled for validation and specifies the widgets in the application's windows, pages, and dialogs. A GUI widget is an element that displays an information arrangement that is changeable by the user, such as a window or a text box. Widgets provide a single interaction point for the direct manipulation of a given kind of data. In this way, widgets are basic visual building blocks which, combined in an application, hold all the data processed by the application and the available interactions on this data.

Applicable widgets include, but are not limited to, widgets that are utilized for the selection and display of collections, such as check boxes, radio buttons, and split button; sliders, list boxes, spinners, drop-down lists. Navigation widgets, such as links, tabs, and scrollbars; text/value input, such as text boxes and combo boxes; output, such as labels, tooltips, balloon help, status bars, progress bars, and infobars are applicable. In addition, widgets that are utilized as containers, such as windows, collapsible panels, modal windows, dialog boxes, utility windows, and frames are also applicable.

Program function 134 can monitor, present, and store the status, results, time stamp, length, and other information that is associated with a GUI metadata comparison. Program function 134 can select a test GUI, for example, from GUI test files 122, to test. Program function 134 can load and execute the GUI comparison. Program function 134 can present and store test results.

Program function 134 can generate metadata for a window, page, or dialog box that includes intrinsic properties, such as captions, as well as the widgets and their associated layouts. Program function 134 can generate metadata formatted in a markup language, such as HTML, XUL, XAML, and XML. Program function 134 can generate metadata formatted in an extension of a markup language. The metadata generated can include widget type, intrinsic properties, such as size, and relative position. For text widgets, such as labels and default text in a text box, program function 134 can generate metadata that includes a globalization identifier rather than the actual included text, which may ensure that the generated metadata is both language and locale agnostic. Metadata globalization identifiers are the same as the application's identifiers and permit the retrieval of the application's associated translation bundles.

Here, the various ID attributes specify the globalization identifiers. The layout elements identify the relative positions of the widgets in a device-agnostic manner as opposed to a pixel. Program function 134 can render GUIs according to a particular Web browser or a version thereof. Program function 134 can capture an image of a GUI. Program function 134 can convert captured GUI images into metadata and/or text (discussed below). Program function 134 can compare metadata, such as the metadata that is included in runtime metadata file 137 and comparison metadata file 135, to ascertain differences therein. Program function 134 can generate notifications that inform a tester/user of a particular GUI that requires additional testing. Program function 134 can identify the context in which images are displayed. For example, program function 134 can identify that a login dialog is displayed after the user clicks a particular button. In an embodiment, program function 134 translates text from one language to another, for example, from English to German. In an embodiment, program function 134 utilizes image capture and/or object character recognition algorithms to convert an image into text.

Figure 4:
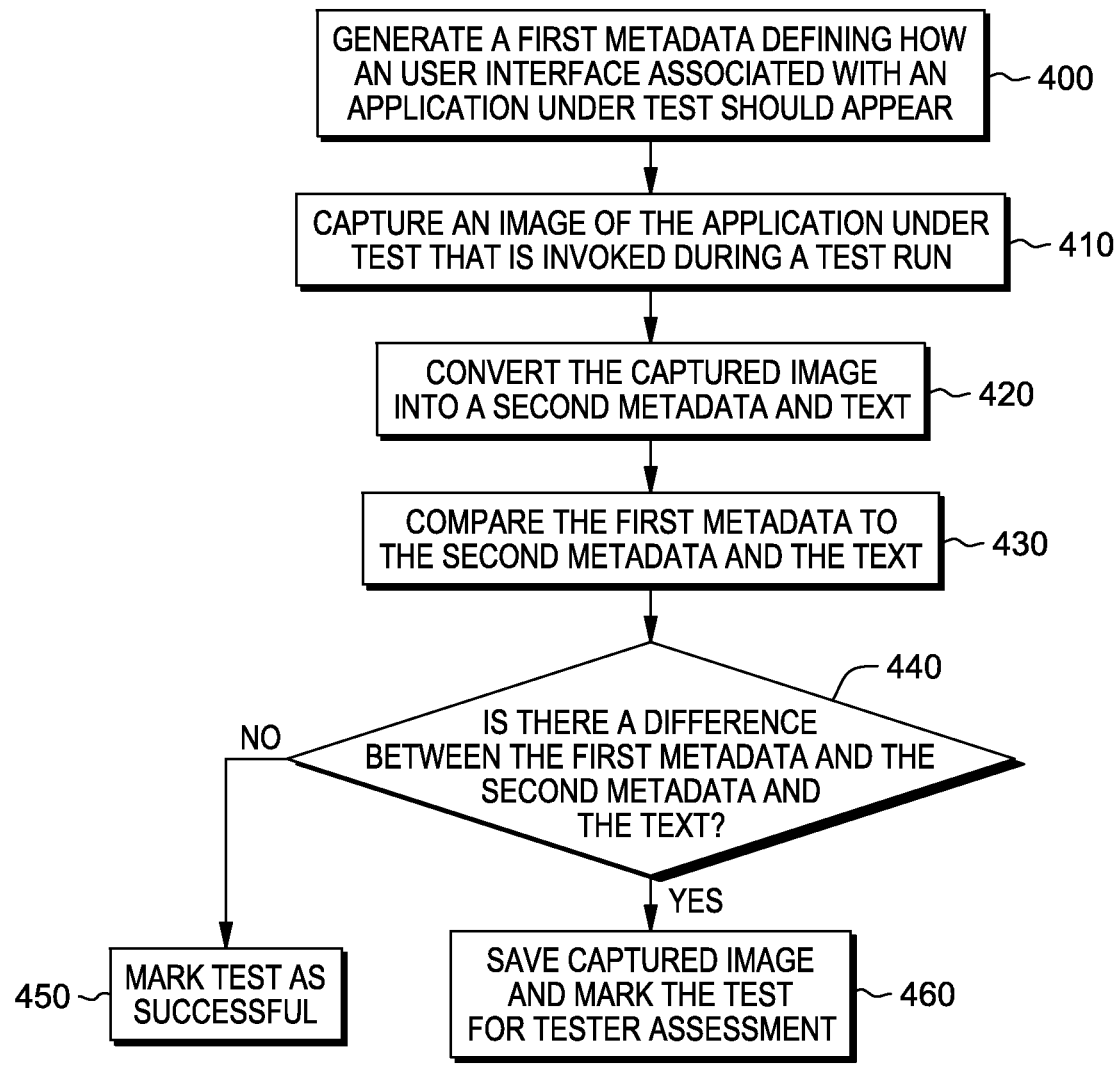
FIG. 4 is a flowchart depicting the operational steps of a program function, in accordance with an embodiment of the present invention.

FIGS. 2 and 3 are utilized in the description of FIG. 4. FIG. 2 depicts a screenshot of a GUI rendered in English by program function 134 according to a particular Web browser, in accordance with an embodiment of the present invention. FIG. 3 depicts a screenshot of the GUI rendered in German by program function 134 according to the same Web browser. Program function 134 monitors GUI test selections that occur within environment 100. A user selects a GUI from GUI test files 122 for testing. In response, program function 134 generates the associated comparison metadata disclosed below and stores it in comparison metadata file 135.

```
<Dialog ID="LoginDialog">
  <LayoutGrid>
    <LayoutRow>
      <LayoutColumn>
        <Label ID="UserNameLabel"/>
      </LayoutColumn>
      <LayoutColumn>
        <TextBox/>
      </LayoutColumn>
    </LayoutRow>
    <LayoutRow>
      <LayoutColumn>
        <Label ID="PasswordLabel"/>
      </LayoutColumn>
      <LayoutColumn>
        <PasswordTextBox/>
      </LayoutColumn>
    </LayoutRow>
```

-continued

```
<LayoutRow>
  <LayoutColumn>
    <CheckBox ID="RememberCheckBox"/>
  </LayoutColumn>
</LayoutRow>
<LayoutRow>
  <LayoutColumn>
    <PushButton ID="LoginButton"/>
  </LayoutColumn>
</LayoutRow>
</LayoutGrid>
</Dialog>
```

Program function 134 can utilize image segmentation to capture, identify, and separate a GUI image into various widgets. Program function 134 can retrieve displayed text from each captured image using optical character recognition and text that is associated with the enclosing widget, such as label and text box.

Once comparison metadata has been generated, program function 135 renders the GUI in the test environment, for example, a rendering of the GUI using the German language within the browser and generates runtime metadata that is stored in runtime metadata file 137. Program function 134 compares the generated comparison metadata to the generated runtime metadata to determine any differences therein. In certain embodiments, program function 134 utilizes a best fit algorithm to find the runtime metadata that most closely matches the comparison metadata. Here, if a difference is found, program function 134 generates a notification that informs the user/tester that further assessment of the particular GUI is needed. For labels and other widgets with associated text, program function 134 can compare the expected and actual text to identify unexpected text, mistranslations, truncation of displayed text, or other text display issues.

In the metadata disclosed above, ID values, such as LoginDialog, UsernameLabel, PasswordLabel, RememberCheckBox, LoginButton, are string resource identifiers that are used by program function 134 to lookup the corresponding string for the given locale. For example, program function 134 determines that the text associated with the LoginDialog ID for an English speaking locale is "User Login", whereas for a German speaking locale it's "Benutzeranmeldung". Program function 134 compares the comparison metadata corresponding to FIG. 2 that is included in comparison metadata file 135 with the runtime metadata corresponding to the GUI of FIG. 3 that is included in runtime metadata file 137 and determines the following issues disclosed in Table 1 and generates a corresponding notification for the user/tester.

TABLE 1

1. UserNameLabel text has been truncated. The text should be "Benutzername" rather than "Benutzerna".
2. Password label text has wrapped with the colon on a separate line.
3. Password is shown in plain text.
4. LoginButton text is too large for the containing widget.

FIG. 4 is a flowchart depicting operational steps of program function 134, in accordance with an embodiment of the present invention. Program function 134 generates a first metadata defining how a user interface that is associated with an application under test should appear (step 400). Program function 134 captures an image of the application under test that is invoked during a test run (step 410). Program function 134 converts the captured image into a second metadata and text (step 420). Program function 134 compares the first metadata to the second metadata and the text (step 430). Program function 134 determines whether there is a difference between the first metadata and the second metadata and text (decisional 440).

If program function 134 determines that there is a difference between the first metadata and the second metadata and text ("yes" branch, decisional 440), then program function 134 saves the captured image and marks the test for tester assessment (step 460). For example, marking the test for tester assessment can involve generating a notification that discloses the test failure and/or that an assessment by the tester/user is required. If program function 134 determines that there is no difference between the first metadata and the second metadata and text ("no" branch, decisional 440), then program function 134 marks the test as successful (step 450).

Figure 5:
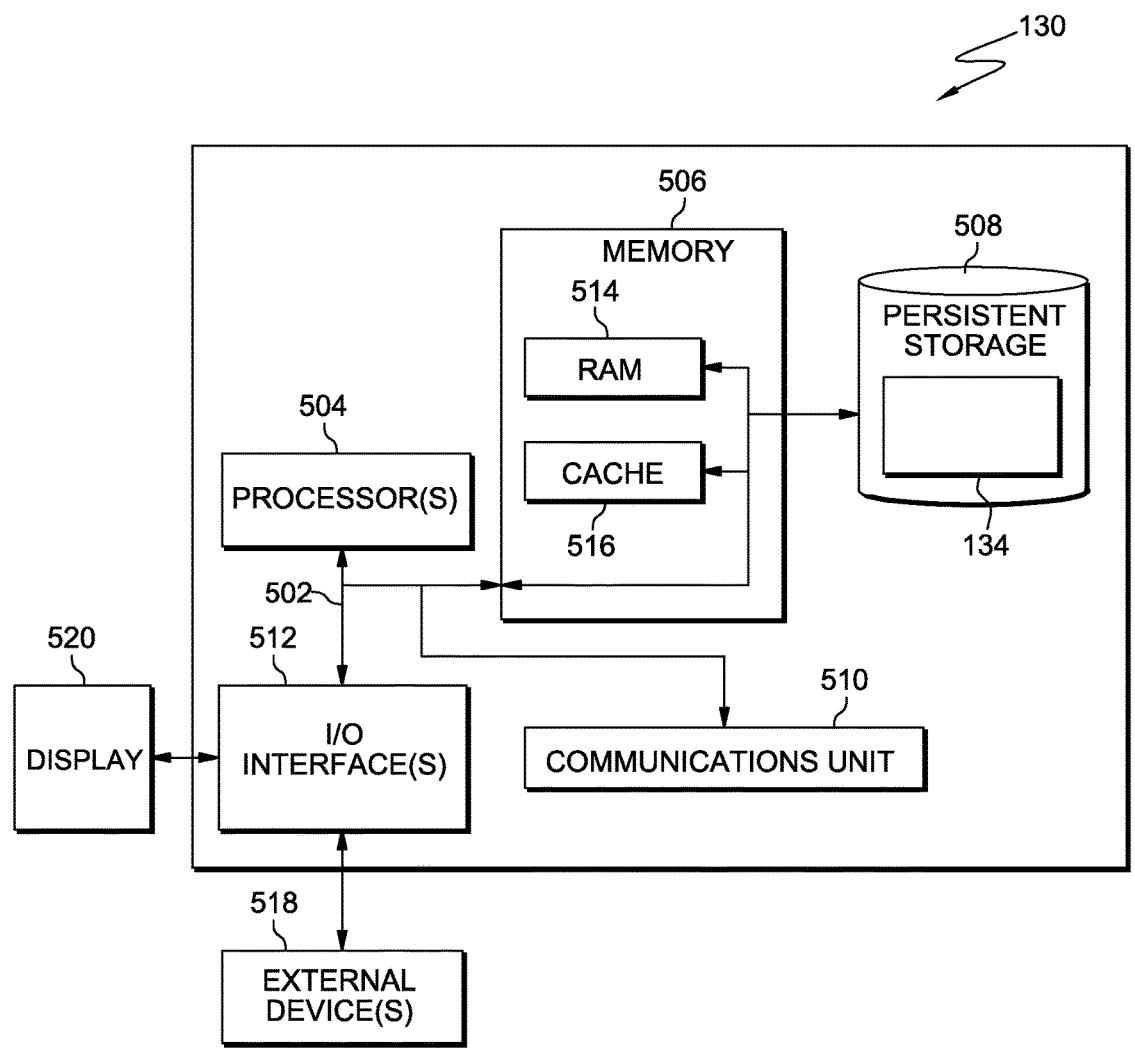
FIG. 5 depicts a block diagram of components of a test server executing the program function, in accordance with an embodiment of the present invention.

FIG. 5 depicts a block diagram of components of test server in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Test server 130 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program function 134 is stored in persistent storage 508 for execution and/or access by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices included in environment 100. In these examples, communications unit 510 includes one or more network interface cards. Communications unit 510 may provide communications through the use of either or both physical and wireless communications links. Program function 134 may be downloaded to persistent storage 508 through communications unit 510.

I/O interface(s) 512 allows for input and output of data with other devices that may be connected to test server 130. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., program function 134, can be stored on such portable computer readable storage media and can be loaded onto persistent storage 508 via I/O interface(s) 512. I/O interface(s) 512 also connects to a display 520. Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience; and thus, the invention should not be limited to use solely in any specific application identified and/or implied by such nomenclature.

What is claimed is:

1. A method for automating validation of appearances of graphical user interfaces, the method comprising:
    creating proper-display metadata defining an appearance of a user interface of an application as it is supposed to be displayed on display devices of users using the application;
    performing a test run of the application;
    during the test run, capturing a set of image(s) which capture how the application actually displays on a test display device of a test user;
    converting the set of image(s) into test-run metadata defining an appearance of the user interface of the application as it is actually displayed on the test display device of the test user;
    comparing the proper-display metadata and test-run metadata to determine that the test-run metadata and the proper-display metadata are different;
    responsive to the determination that the proper-display metadata and the test-run metadata are different, saving the set of image(s);
    further responsive to the determination that the proper-display metadata and the test-run metadata are different, assessing, by a tester, the saved set of image(s) to determine whether the test run reflects a problem with the user interface of the application.

2. The method according to claim 1, wherein the proper-image metadata for a window, page or dialog includes at least one of the following intrinsic properties: a caption, a widgets or a layout of a widget.

3. The method according to claim 1, wherein the proper-image metadata for text widgets includes a globalization identifier.

4. A computer program product for automating validation of appearances of graphical user interfaces, the computer program product comprising:
    a machine readable storage device; and
    computer code stored on the machine readable storage device, with the computer code including instructions for causing a processor(s) set to perform operations including the following:
    creating proper-display metadata defining an appearance of a user interface of an application as it is supposed to be displayed on display devices of users using the application;
    performing a test run of the application;
    during the test run, capturing a set of image(s) which capture how the application actually displays on a test display device of a test user;
    converting the set of image(s) into test-run metadata defining an appearance of the user interface of the application as it is actually displayed on the test display device of the test user;
    comparing the proper-display metadata and test-run metadata to determine that the test-run metadata and the proper-display metadata are different;
    responsive to the determination that the proper-display metadata and the test-run metadata are different, saving the set of image(s);
    further responsive to the determination that the proper-display metadata and the test-run metadata are different, assessing, by a tester, the saved set of image(s) to determine whether the test run reflects a problem with the user interface of the application.

5. The computer program product according to claim 4, wherein the proper-image metadata for a window, page or dialog includes at least one of the following intrinsic properties: a caption, a widgets or a layout of a widget.

6. The computer program product according to claim 4, wherein the proper-image metadata for text widgets includes a globalization identifier.

7. A computer system for automating validation of appearances of graphical user interfaces, the computer system comprising:
    a processor(s) set;
    a machine readable storage device; and
    computer code stored on the machine readable storage device, with the computer code including instructions for causing the processor(s) set to perform operations including the following:
    creating proper-display metadata defining an appearance of a user interface of an application as it is supposed to be displayed on display devices of users using the application;
    performing a test run of the application;
    during the test run, capturing a set of image(s) which capture how the application actually displays on a test display device of a test user;
    converting the set of image(s) into test-run metadata defining an appearance of the user interface of the application as it is actually displayed on the test display device of the test user;
    comparing the proper-display metadata and test-run metadata to determine that the test-run metadata and the proper-display metadata are different;
    responsive to the determination that the proper-display metadata and the test-run metadata are different, saving the set of image(s);
    further responsive to the determination that the proper-display metadata and the test-run metadata are different, assessing, by a tester, the saved set of image(s) to determine whether the test run reflects a problem with the user interface of the application.

8. The computer system according to claim 7, wherein the proper-image metadata for a window, page or dialog includes at least one of the following intrinsic properties: a caption, a widgets or a layout of a widget.

9. The computer system according to claim 7, wherein the proper-image metadata for text widgets includes a globalization identifier.

\* \* \* \* \*